United States Patent
Ketcham

(10) Patent No.: US 6,704,357 B1
(45) Date of Patent: Mar. 9, 2004

(54) METHOD AND APPARATUS FOR RECONSTRUCTION OF LOW FRAME RATE VIDEO CONFERENCING DATA

(75) Inventor: Carl Ketcham, Salt Lake City, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/408,974

(22) Filed: Sep. 28, 1999

(51) Int. Cl.[7] .............................. H04B 7/66; H04N 5/14
(52) U.S. Cl. ...................................... 375/240.01; 348/15
(58) Field of Search ...................... 375/240.01, 240.02, 375/240.03, 240.12, 240.13, 240.15, 240.16, 240.26, 240.27, 240.28, 240.29, 240.24; 348/411.1, 412.1, 413.1, 414.1, 416.1, 699, 700, 701; H04B 1/66; H04N 5/14

(56) References Cited

U.S. PATENT DOCUMENTS

| | | | | |
|---|---|---|---|---|
| 5,144,429 A | * | 9/1992 | Haghiri et al. | 358/138 |
| 5,831,688 A | * | 11/1998 | Yamada et al. | 348/699 |
| 6,192,079 B1 | * | 2/2001 | Sharma et al. | 375/240.16 |
| 6,393,153 B2 | * | 5/2002 | Ozaki | 382/233 |
| 6,414,999 B1 | * | 7/2002 | Igi et al. | 375/240.26 |

* cited by examiner

Primary Examiner—Chris Kelley
Assistant Examiner—Tung Vo
(74) Attorney, Agent, or Firm—McDonnell Boehnen Hulbert & Berghoff

(57) ABSTRACT

A method and apparatus for improving the playback quality of audio/video streams encoded for transmission using low frame rate motion compensated coding. When a transmitting system sends an audio/video stream encoded using low frame rate motion compensated waveform, a receiving system may decode and then re-encode the stream to perform a more exhaustive search for new motion vectors that were not detected by the transmitting system. The method and system further provides improved motion compensated interpolation processes that the receiving system may use in conjunction with, or separately from re-encoding of an audio/video stream to produce a better quality playback of the stream. The method and system is particularly useful for video conferencing sessions transmitted at low rates using H.263 standard, but may be useful in other scenarios as well.

17 Claims, 4 Drawing Sheets

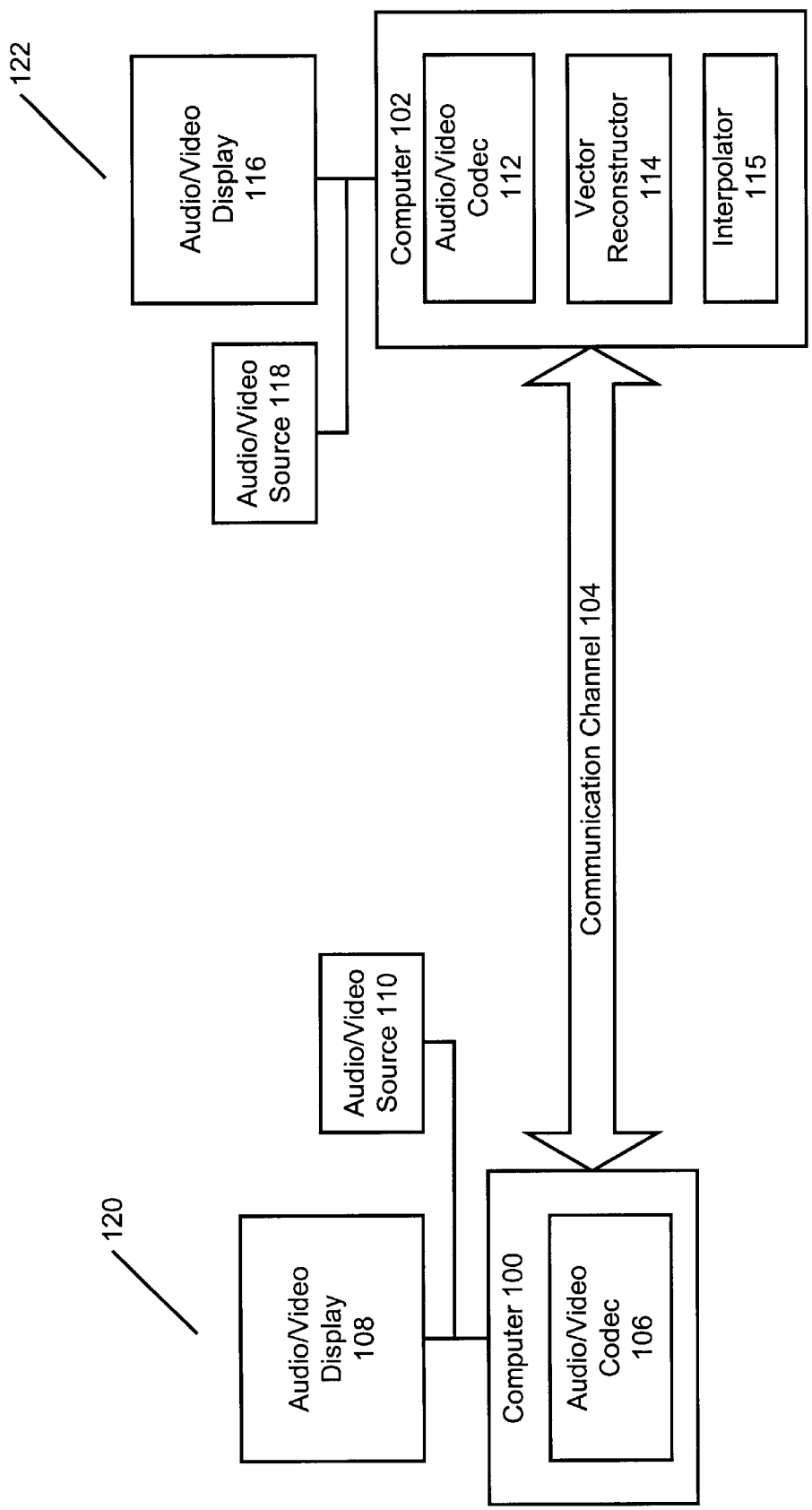

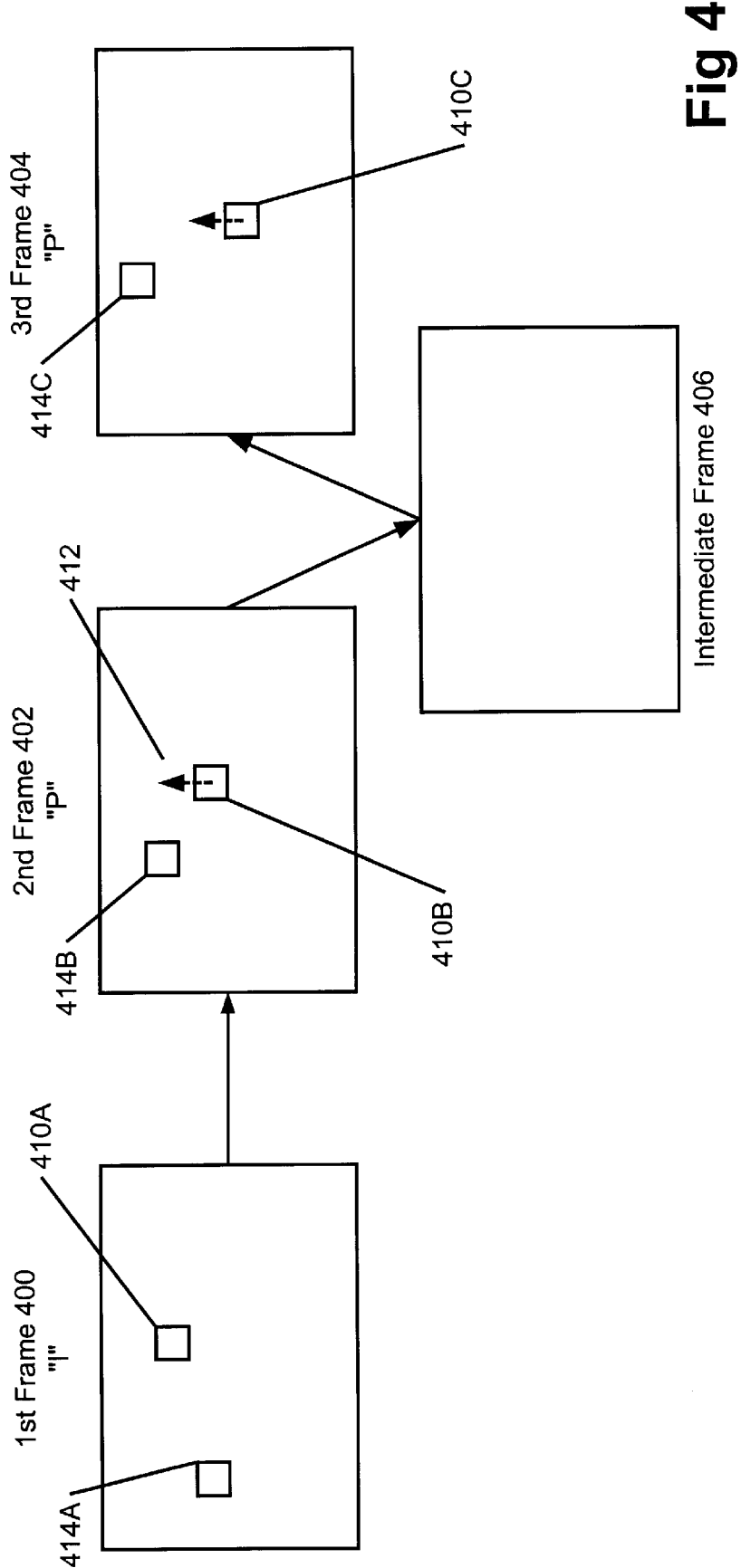

METHOD AND APPARATUS FOR RECONSTRUCTION OF LOW FRAME RATE VIDEO CONFERENCING DATA

BACKGROUND OF THE INVENTION

1. Field of the Invention

This invention relates to the field of video stream reconstruction. In particular, the invention relates to methods and apparatuses for reconstructing low frame rate video conferencing data.

2. Description of the Related Art

The bandwidth requirements for uncompressed video streams, such as for video conferencing, can easily exceed channel bandwidth. For example, the public switched telephone network supports a maximum of approximately 56 Kbits/second. However, the common video conferencing format of quarter common intermediate format (QCIF) at 30 frames/second and 24 bits per pixel would requires 18.3 Mbits/second if uncompressed. Thus, the uncompressed video stream would require over 300 times more bandwidth than is available.

For this reason, a number of compression schemes have been developed for moving video. Generically, these compression schemes are motion compensated waveform coders. This class of coders includes several standard encoding techniques such as Moving Pictures Experts Group Level 1 (MPEG-1), MPEG-2, MPEG-4, H.261, and H.263. The basic approach of these various motion compensated coding techniques is the same, a current frame can be predicted from a previous frame—or later frames—using motion information.

Thus, instead of transmitting each frame in a video stream, only a small number of frames need to be sent in full. Instead, most frames are represented by a set of motion vectors that determine for each pixel in the current frame, their location in the previous frame. Thus, for example, the first frame in a sequence might be transmitted to the receiving computer, but the second frame might be represented by vectors describing movement of blocks from previous frames.

The different standards are each targeted at various applications. For example, MPEG-1 is directed primarily to compact disc based video whereas MPEG-4 and H.263 are directed to lower bit rate—and frame rate—encoding systems suitable for video conferencing. However, even using a standard such as H.263, the low frame rate may cause the motion to appear unnatural, or jerky. As the frame rate of the drops, this problem is further exacerbated.

One solution is to have the receiving computer interpolate additional frames. For example, if the transmitted frame sequence is {1, 2, 3, 4, . . . }, the receiver can interpolate additional frames, {1.5, 2.5, 3.5, 4.5, . . . } to be shown between the transmitted frames. However, the appearance of the reconstructed stream with the additional frames can still be fairly unnatural and jerky.

Also, the quality of the reconstructed video stream is limited by the quality of the search for motion vectors performed by the transmitting computer. If for example, the transmitting computer does not have the computational power to perform an adequate search, the quality of the reconstructed frames will suffer. If an interpolation technique is used to create additional frames, the unnaturalness and jerkiness of the motion may be more apparent with fewer motion vectors.

The previous techniques do not allow for the interpolation of frames into low rate video streams in a manner that provides a natural appearance to the motion. Accordingly, what is needed is an improved method for interpolation of low frame rate video streams.

SUMMARY OF THE INVENTION

Embodiments of the invention are directed to improving the playback quality of low frame rate motion compensated waveform encoded audio/video streams. Typical examples of motion compensated waveform encoded audio/video streams include Moving Pictures Experts Group Level 1 (MPEG-1), MPEG-2, MPEG-4, H.261, and H.263 encodings. Embodiments of the invention can operate on the decoding, or receiving, side without the need for modifying the encoding, or transmitting, side. Thus, the playback quality of a standard MPEG-2 video stream can be enhanced by the system playing the video stream. These playback quality improvements are particularly useful for video conferencing audio/video streams and/or other audio/video streams that are transmitted at low frame rates, e.g. using H.263.

In order to improve playback quality, some embodiments of the invention re-encode a motion compensated waveform encoded audio/video stream at the receiving system. This allows for the detection of the movement of regions between frames that was not detected by the transmitting, encoding, side. For example, consider a region of a frame in which a person is in the process of waving her hand. The transmitting system may not have adequate processing power to complete an exhaustive search to detect the location of the hand region between frames. As such, the encoded video stream will lack motion vectors completely describing the motion of the hand.

However, at the receiving side, the computer can re-encode the stream, after decoding the stream, to perform a more exhaustive search for motion vectors. Thus, the movement of the hand region between frames can be more fully described. That additional region movement information can then be used to produce better quality playback in conjunction with motion compensated interpolation.

Some embodiments of the invention include improved motion compensated interpolation processes. These improved processes can be used in conjunction with, or separately from, the re-encoding process to improve the quality of the additional frames. The improved motion compensated interpolation processes reduce unnatural and jerky motion sometimes introduced by motion compensated interpolation. This improvement allows for the use of repeated interpolation and replacement frames to correct for inaccurate interpolated frames. This process prevents jerky motion between the interpolated frames and the actual frames.

BRIEF DESCRIPTION OF THE FIGURES

FIG. 1 illustrates a system for reconstructing a video stream according to some embodiments of the invention.

FIG. 4 illustrates the problem caused by an inadequate search for motion vectors by a transmitting computer.

DETAILED DESCRIPTION

A. System Overview

Figure 3:
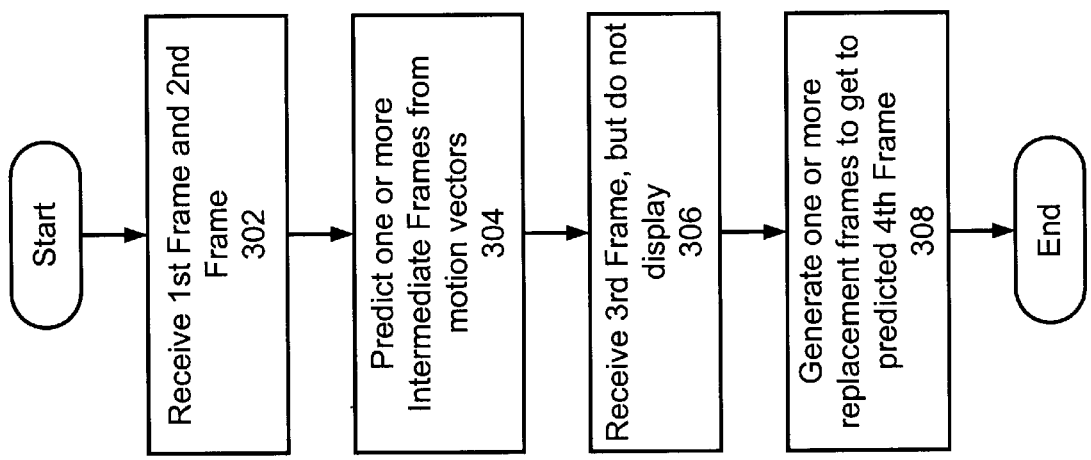
FIG. 3 is a process flow diagram for reconstructing a video stream with interpolated frames.

FIG. 1 illustrates a system for reconstructing a video stream according to some embodiments of the invention. The embodiments of the invention can be used with a video conferencing station to improve the quality of the reconstructed video. This paragraph lists the elements of FIG. 1 and describes their interconnections. FIG. 1 includes a video conferencing station 120 and a video conferencing station 122. The video conferencing stations 120–122 are coupled in communication by a communication channel 104. The video conferencing station 120 includes a computer 100 coupled to an audio/video display 108 and an audio/video source 110. The computer 100 includes an audio/video codec 106. The term codec stands for compressor-decompressor and refers a software and/or hardware unit capable of compressing and decompressing audio/video streams. The video conferencing station 122 includes a computer 102 coupled to an audio/video display 116 and an audio/video source 118. The computer 102 includes an audio/video codec 112, a vector reconstructor 114 and an interpolator 115.

The following describes the uses of the elements of FIG. 1. The video conferencing station 120 is a video conferencing station such as an H.320 terminal, an H.321 terminal, an H.323 terminal, an H.324 terminal, a personal computer, and/or some other type of video conferencing station. The computer 100 may be a personal computer, a thin client computer, a server computer, a dedicated video conferencing computer, and/or some other type of computer. The audio/video display 108 may be a television, a computer monitor and speakers, and/or some other type of display and/or speakers. The audio/video source 110 may be a video camera, a digital camera, a computer camera and speakers, and/or some other type of audio/video source. For example, the audio/video source might include a previously recorded event from a memory within the computer 100 or a video cassette recorder coupled to the computer 100.

The audio/video codec 106 may be implemented in software, hardware, or a combination of the two. Typically the audio/video codec 106 implements one or more encoding and decoding protocols such as MPEG-1, MPEG-2, MPEG-4, H.261, H.263, and/or some other protocols. More generally, an audio/video codec is capable of supporting motion compensated waveform encoding and decoding. In some embodiments, the audio/video codec 106 can support the encoding of a video stream at the same time another video stream is being decoded. In other embodiments, the audio/video codec 106 is comprised of multiple audio/video codecs to support video conferencing.

The communication channel 104 represents any communications linkage between the two video conferencing stations 120–122. The communication channel may be a switched channel, e.g. through the public switched telephone network (PSTN), a packet switched channel, e.g. through the Internet or some other network, a wireless channel, and/or combinations of different types of channels. In this example, the communication channel 104 represents a packet switched channel through the Internet. Using the communication channel 104, users of the respective video conferencing stations 120–122 may communicate with each other in video and/or audio modes.

The video conferencing station 122 includes many components similar to the video conferencing station 120. The audio/video display 116 could be any audio/video display and may be the same or different than the audio/video display 108. For example, the audio/video display 108 might be a television, while the audio/video display 116 is a computer monitor and speakers. The audio/video source 118 could be any audio/video source and may be the same or different than the audio/video source 110. The video conferencing station 122 includes the computer 102. The computer 102 may be any type of computer and may be the same or different than the computer 100.

The computer 102 includes an audio/video codec 112. The audio/video codec 112 could be any type of audio/video codec. In order for the video conferencing station 120 and the video conferencing station 122 to communicate with one another the audio/video codec 106 and the audio/video codec 112 should support compatible formats. For example, if the audio/video codec 106 supports H.263 and MPEG-4, in order for the two video conferencing stations to communicate, the audio/video codec 112 should support at least one of H.263 and MPEG-4.

The video conferencing station 122 also includes additional components to improve the quality of reconstructed video: the vector reconstructor 114 and the interpolator 115. The vector reconstructor 114 and the interpolator may be implemented in hardware, software, or a combination of the two. In some embodiments, the interpolator 115 may be present without the vector reconstructor 114. In other embodiments, the vector reconstructor 114 may be paired with different types of interpolators other than the interpolator 115.

For example, the interpolator 115 might be replaced with a generic motion compensated interpolator designed to produce in-between frames. One such replacement interpolator is described by Guido M. Schuster and Aggelos K. Katsaggelos in "Rate-Distortion Based Video Compression", Kluwer Academic Publishers, 1997, pp 142–150. Pairing the vector reconstructor 114 with Schuster may produce better quality interpolated frames than using the Schuster interpolation alone. However, the problem of jerky and unnatural motion may remain unless a motion compensated interpolator such as the interpolator 115 is used.

The processes used by the vector reconstructor 114 are discussed in greater detail below in the section "Vector Reconstruction". The processes used by the interpolator 115 are discussed in greater detail below in the section "Adjusted Motion Compensation Interpolation".

B. Vector Reconstruction

Figure 2:
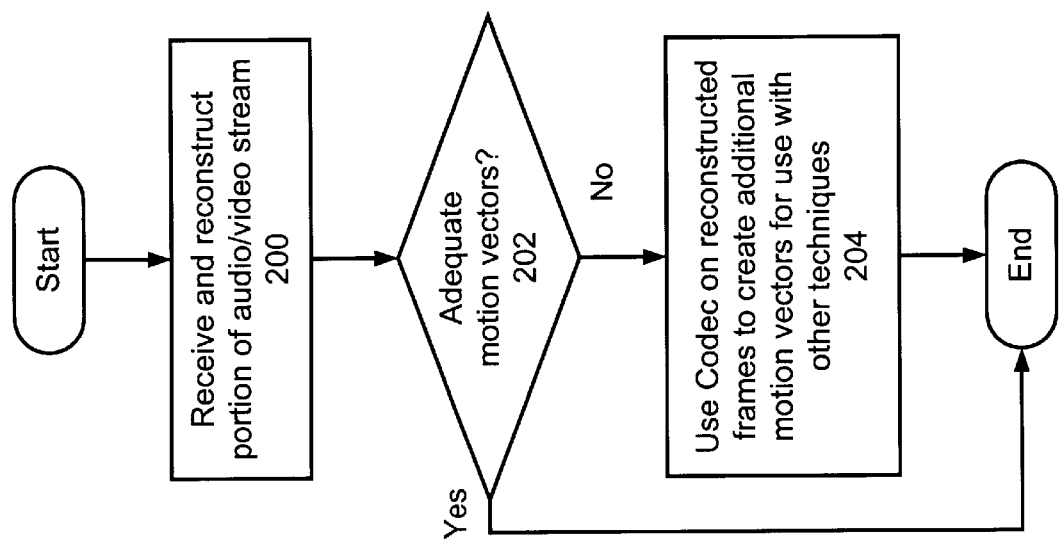
FIG. 2 is a process flow diagram for constructing additional motion vectors on a computer receiving an encoded video stream.

The processes used by some embodiments of the invention to reconstruct additional motion vectors on a receiving video conferencing station will now be discussed in conjunction with FIGS. 2 and 4. FIG. 2 is a process flow diagram for constructing additional motion vectors on a computer receiving an encoded video stream. FIG. 4 illustrates the problem caused by an inadequate search for motion vectors by a transmitting computer. The process could be used by the vector constructor 114 to construct additional motion vectors on a computer for use in conjunction with a motion compensated interpolation process and address the problem demonstrated by FIG. 4.

1. Inadequate Search Problem for Motion Compensated Interpolation

FIG. 4 shows several reconstructed frames from a video stream to explain the problem of inadequate search and how the process of FIG. 2 can allow a computer receiving such a video stream to address the problem. The first frame 400 is an "I" frame. Thus, the first frame 400 is transmitted as an entire still image. The first frame includes two regions, or blocks in MPEG terminology, the region 410A and the region 414A. These could be any two regions in the first frame 400. In MPEG terminology, each region may be a block and/or some other portion of a frame.

For example, the region 414A might include part of a remote video conference participant's hand and the region 410A might include part of a remote video conference participant's face. The second frame 402 is a "P" frame. That means that regions of the second frame are either described as still images or a motion vector describing where a particular region was in the previous frame. In the example, on the second frame 402, the region 410B has moved down slightly from its position in the first frame 400. This movement is represented by the vector 412 that describes the region 410B as being related to a block at a certain position in the previous frame.

In contrast, the region 414B, which has the same content as the region 414A, was not detected as being related to the region 414A and thus had to be transmitted as a still image region. While this is not a problem for the display of an ordinary video stream in terms of being able to decode and display the third frame 404, it is a problem for creating an intermediate frame 406 using motion compensate interpolation.

That is because, the motion information about the region 414A and the region 414B was not captured due to the low quality search for motion vectors by the transmitting, or encoding, computer. Thus, it is not possible to predict where the region 414B should be positioned on the intermediate frame 406. Thus, while it is possible to predict the movement of the region 410B on the intermediate frame 406, it is not possible to predict the movement of the region 414B on the intermediate frame 406.

The result is that the receiving, or decoding, computer can actually improve the quality of the displayed video when interpolation is used. For example, if the interpolator 115 is used without the process of FIG. 2, then the region 414B would be shown statically on the intermediate frame 406 because there is a lack of motion information about the region 414B. In reality however, the region 414B was in motion and the transmitting, or encoding, computer failed to detect the movement, e.g. due to a lack of an exhaustive search. By applying the process of FIG. 2, the motion information for the region 414B can be recaptured by the receiving, or decoding, computer for use in motion compensated interpolation.

The effect is apparent when the third frame 404 is examined. The region 410C has continued to moved down slightly and the region 414C has continued to move up and across slightly. The vector 414 would allow the region 410B to be interpolated to multiple intermediate positions between the position in the second frame 402 and the third frame 404. In contrast, the absence of a vector for the region 414B prevents the prediction of motion for the region 414B between the second frame 402 and the third frame 404.

2. A Receiver Side Only Solution

The following explains the process of FIG. 2 in greater detail. This process can be used by the vector reconstructor 114 to allow the generation of higher quality motion compensated interpolated video by the interpolator 115.

First, at step 200 a portion of the audio/video stream is received and reconstructed by a receiving video conferencing station, e.g. the video conferencing station 122. To simplify the discussion let us consider a video stream S={1,2,3,4,5, . . . } comprised of frames.

At the transmitting side, e.g. the video conferencing station 120, the frames are encoded by the audio/video codec 106 to form an encoded stream S'={1',2',3',4',5', } of compressed frames. Frames in the encoded stream S' are typically represented by vectors describing the relation of regions of a frame, e.g. 2', to regions in a previously transmitted frame, e.g. 1'. In MPEG terms, frame 1' might be an "I" frame, while frame 2' might be a "P" frame.

At the receiving side, e.g. the video conferencing station 122, the frames are reconstructed by the audio/video codec 112 to form a reconstructed video stream $\hat{S}=\{\hat{1},\hat{2},\hat{3},\hat{4},\hat{5}, \ldots\}$. Because most video compression streams are lossy, the frames of the reconstructed video stream may not be identical to the frames of the original video stream S.

Next at step 202, the vectors of the encoded video stream are examined. The quality of motion compensated interpolation will depend on the quality of the search performed by the encoding system, e.g. how large a window does the encoding system use to find matching regions. If the encoding system, e.g. the video conferencing station 120, often limited its search to a range of ±16 pixels horizontally and ±8 pixels vertically because of processing constraints, then the vectors may not be adequate for motion compensated interpolation. In some embodiments, a predetermined threshold is used to determine whether there are adequate vectors.

For example, the number of regions coded as still images in frames could be used to assess the quality of the search performed. Video conferencing applications tend to have relatively little movement from frame to frame. Further, the contents of the frames do not change greatly. This makes the images in video conferencing highly susceptible to encoding frames with vectors to describe one frame in relation to a previous frame. Therefore, if the receiving computer is sent a large number of frames that include regions encoded as still images, then a determination can be made that the quality of the search is inadequate for motion compensate interpolation.

A threshold of no more than N still image regions per non-"I" frame could be set on a per application and per format basis. For example, for video conferencing N might be set to 20 for a quarter common intermediate format (QCIF) video conferencing data with 16 pixel by 16 pixel square regions. Quarter common intermediate format provides a 176 pixel by 144 pixel image and with 16 pixel by 16 pixel regions, there are 99 square regions. The exact value of N can be adjusted up or down. Alternatively, the number of vectors can be compared to a threshold, e.g. at least 79 vectors. In still other embodiments, the number of vectors can be determined as a percentage of the total number of regions for a particular application, e.g. 80% of regions should be described as vectors.

In other embodiments, the size of the blocks is used to determine whether or not there are adequate motion vectors, e.g. always perform new vector generation if block size is greater than 8 pixel by 8 pixel blocks.

In some embodiments, the process occurs a single time, early in the receipt of a video stream. In other embodiments, the process may be repeated periodically to reassess the quality of the received motion vectors. For example, the process could be repeated once per minute. In other embodiments, the process occurs on an ongoing basis with all of the encoded frames of the video stream analyzed.

If adequate vectors are found, the process ends. However, if there are not adequate vectors, the process continues at step 204.

At step 204, a codec such as the audio/video codec 112 and/or a different codec is used on the reconstructed frames to create a new set of vectors by performing a more exhaustive search. So for example, if there were not adequate vectors, then the reconstructed frames $\hat{1}$ and $\hat{2}$ can be used to generate a second set of vectors, e.g. 2".

That second set of vectors can then be used for motion compensated interpolation. Some embodiments of the invention can couple this process with an interpolator such as the interpolator 115. Other embodiments of the invention use other interpolation techniques. Notably this process can be implemented solely on the receiver side without any modification to the transmitting side, the transmitting system, or the original encoding of the video stream.

C. Adjusted Motion Compensated Interpolation

FIG. 3 is a process flow diagram for reconstructing a video stream with interpolated frames. This process could be used by the interpolator 115. In some embodiments, this process could be used in conjunction with the process of FIG. 2 such as with a vector reconstructor 114. The process of FIG. 3 will be described with reference to FIG. 5 that illustrates the use of the reconstruction process.

Figure 5:
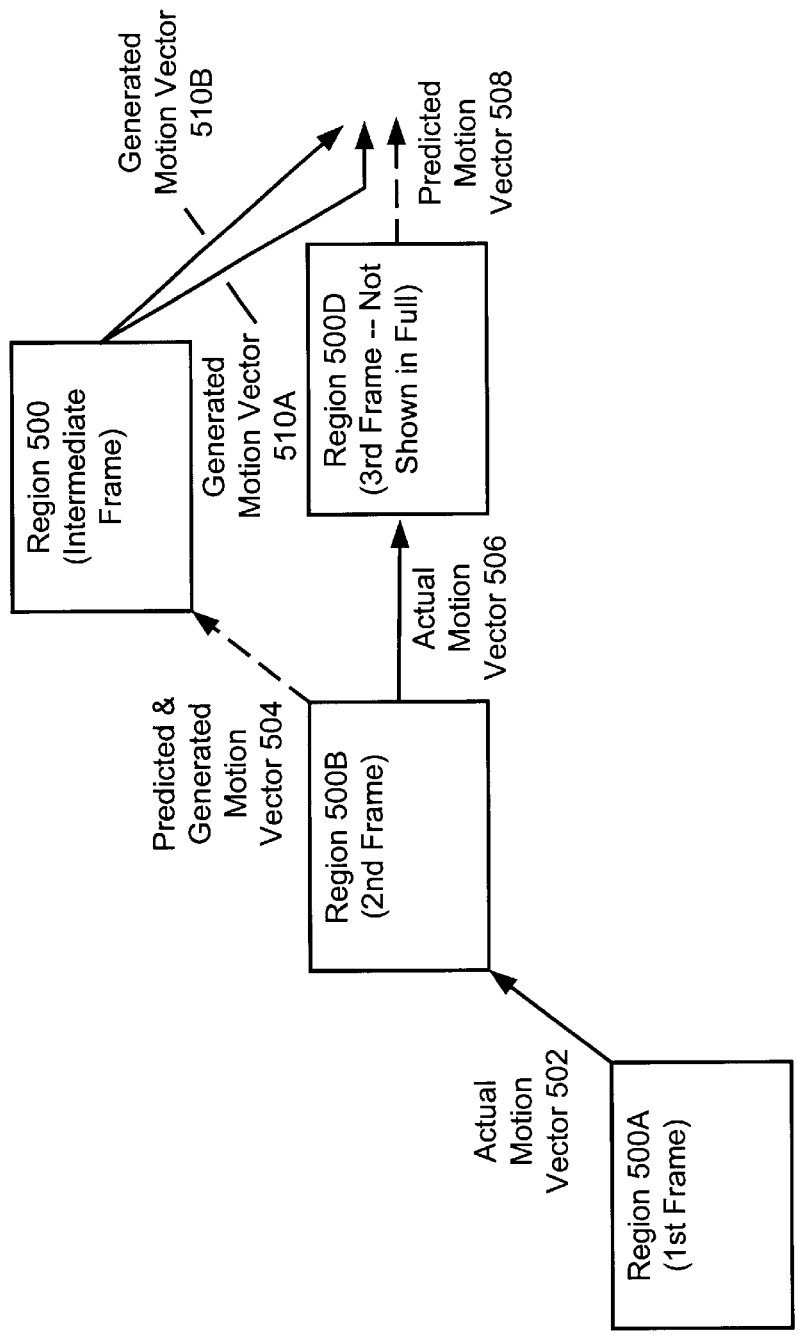
FIG. 5 illustrates the use of the reconstruction process.

First, at step 302, the first two encoded frames are received, e.g. 1' and 2'. The frames can be reconstructed and be displayed in sequence. Turning to FIG. 5, a region 500A within the first reconstructed frame is shown. Then, the actual motion vector 502 is used to adjust the position of the region 500A within the second frame. The adjusted position is shown as the region 500B.

A motion vector is directly related to the vectors in the encoded stream, but the motion vector is the forward predicted direction for a region. For example, returning to FIG. 4, the vector 414 describes where the region 410B was in the previous frame. For purposes of motion compensated interpolation, the goal is to predict the location of the region 410B in subsequent frames. Therefore, the motion vector would be equal in magnitude to the vector 412, but in the opposite direction, e.g. the motion vector is the inverse of the vector.

Then, at step 304, one or more intermediate frames can be predicted from the motion vectors. In some embodiments, the frames are predicted on the assumption that the motion vectors continue in the same direction. Thus, the intermediate frame 2.5 could be generated, using a predicted and generated motion vector 504. This is shown as the region 500C.

Next, at step 306, the actual motion vector 506 is received with the encoded third frame, e.g. 3', but the reconstructed third frame is not entirely displayed. If the reconstructed third frame was entirely shown, the movement could be unnatural and jerky. For example, here, if the region 500A–C was a person's head, suddenly the head would jerk down to the position shown for the region in the third frame as the region 500D. Showing the third frame can cause the appearance of the motion compensated interpolation sequence to look like the television character "Max Headroom".

Finally, at step 308, one or more replacement frames generated to move to a predicted fourth frame. For example, using the actual motion vector 506, a predicted motion vector 508 between the third and fourth frames is predicted. The prediction can use the assumption that the region's movement will continue in the same direction. Then, one or more motion vectors is generated, e.g. the generated motion vectors 510A–B, to move the region 500C to its predicted location in the fourth frame. This may involve the generation of several replacement frames. The path created by the motion vectors may first move towards the actual position of the third frame, e.g. the generated motion vector 510A, or may move more directly to the predicted position in the fourth frame, e.g. the generated motion vector 510B.

The term replacement frame refers to a reconstructed frame comprised of a mixture of regions from the reconstructed frame as well as interpolated regions. Thus a replacement frame, e.g. R3, may actually be comprised of some regions from reconstructed frame three, e.g. $\hat{3}$, and some regions positioned according to interpolation from an intermediate frame. Thus, for example if regions other than the region 500B followed the predicted and generated motion vectors between reconstructed frame two and reconstructed frame three, those regions of reconstructed frame three might be included in R3. However, the region 500C of reconstructed frame three would not be used and instead the region would be shown according to the generated motion vector 510A or the generated motion vector 510B.

In some embodiments of the invention a curve is fit to the motion vectors derived from a previously received frame, e.g. 2', and a newly received frame, e.g. 3'. This curve fitting approach reduces the unnatural motion otherwise seen and leads to the position of the regions in the replacement frame, e.g. R3, as well as the position of the region in subsequent intermediate frames.

The process of FIG. 3 can continue as additional frames are received. For example, additional intermediate frames based off of R3 could be generated to precede frame four.

Periodically, a fully reconstructed frame, e.g. $\hat{8}$, can be shown to insure that the video stream being displayed to the user is not overly diverging from the original video stream. In some embodiments, all "I" frames are shown to ensure that the displayed stream does not overly diverge from the original stream. Any unnatural movement introduced by this could be reduced by introducing additional intermediate frames immediately prior to the display of the "I" frame.

In the example of FIG. 5, the entire reconstructed frame four could be shown if the actual motion vectors are within a certain tolerance of the predicted vectors. The Euclidean distance between the actual and predicted motion vectors can be used to determine whether or not replacement frames should be generated. If the Euclidean distance exceeds a threshold amount for one or more regions, then a replacement frame could be used with those regions replaced. Otherwise, the reconstructed frame can be used entirely.

In FIG. 5, the Euclidean distance between the predicted and generated motion vector 504 and the actual motion vector 506 exceeded the threshold for the region 500B. As a result, reconstructed frame three was not shown entirely and a replacement frame three was generated that included a replacement for the region 500D. If however, reconstructed frame four exhibits close to the predicted motion vector 508 for the region 500D, then the corresponding region on reconstructed frame four can be shown.

To help compare the different approaches, various frame sequences are shown in Table 1 according to different embodiments of the invention.

TABLE 1

| Video Stream Name | Content |
|---|---|
| Original Video Stream | $S = \{1, 2, 3, 4, 5, \ldots\}$ |
| Encoded Stream (original motion vectors can be directly determined from vectors) | $S' = \{1', 2', 3', 4', 5', \ldots\}$ |
| Reconstructed Stream w/o interpolation | $\hat{S}_1 = \{\hat{1}, \hat{2}, \hat{3}, \hat{4}, \hat{5}, \ldots\}$ |
| Reconstructed Stream w/ adjusted motion compensated interpolation | $\hat{S}_2 = \{\hat{1}, \hat{2}, 2.5, R3, 3.3, 3.6, 3.9, \ldots\}$, after a replacement frame, additional intermediate frames may be added to bring the region to the new predicted location |
| Re-encoded Stream by Receiver (includes new vectors from a better | $S'' = \{1'', 2'', 3'', 4'', 5'', \ldots\}$, built from encoding $\hat{S}_1$ |

TABLE 1-continued

| Video Stream Name | Content |
| --- | --- |
| search, motion vectors can be directly determined from vectors) Reconstructed stream w/ vector reconstruction and Schuster motion compensated interpolation | on the receiving video conferencing station. $\hat{S}_3 = \{\hat{1}, \hat{2}, 2.5, \hat{3}, 3.5, \hat{4}, 4.5, \hat{5}, \ldots\}$, where intermediate frames are built using motion vectors determined from re-encoded stream, S". |
| Reconstructed stream w/ vector reconstruction and adjusted motion compensated interpolation. | $\hat{S}_4 = \{\hat{1}, \hat{2}, 2.5, R3, 3.3, 3.6, 3.9, \ldots\}$, where intermediate frames and replacement frames are built using motion vectors determined from re-encoded stream, S". |

The notation used in Table 1 is as follows. An intermediate frame, or frames, is indicated by decimal points, e.g. 3.5 is an intermediate frame between frames three and four. The letter "R" in front of a frame indicates a replacement frame, or frames, e.g. R3 refers to a frame displayed instead of frame three according to the process of FIG. 3. As shown in $\hat{S}_4$, the number of intermediate frames can vary. Typically, after a replacement frame additional intermediate frames are shown to gradually bring regions back along the path of newly predicted motion vectors.

D. Alternative Embodiments

In some embodiments, the audio/video codec 112, the vector reconstructor 114, and the interpolator 115 can be hardware based, software based, or a combination of the two. In some embodiments, vector reconstructor programs and programs for the interpolator programs are included in one or more computer usable media such as CD-ROMs, floppy disks, or other media.

Some embodiments of the invention are included in an electromagnetic wave form. The electromagnetic wave form comprises information such as vector reconstructor programs and interpolator programs. The electromagnetic waveform might include the vector reconstructor programs and the interpolator programs accessed over a network.

Some embodiments of the invention can use the vector reconstructor 114 and/or the interpolator 115 on video streams from sources other than video conferences, e.g. a CD-ROM, an MPEG encoded video stream, an AVI encoded video stream, etc. For example, a web site might have an encoded video stream. Embodiments of the invention could be used to enhance the playback quality and frame rate of the video stream, e.g. through motion compensated interpolation of additional frames. This can have a beneficial effect on the playback quality of low frame rate video streams.

E. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A method of reconstructing a video stream using a computer, the video stream including at least a first frame, a second frame, and a third frame, the first frame preceding the second frame in the video stream, the second frame preceding the third frame in the video stream, the method comprising:

receiving the first frame and a plurality of vectors describing changes from the first frame to the second frame on the computer;

decoding the first frame and the plurality of vectors to produce a reconstructed second frame, the reconstructed second frame corresponding to the second frame;

determining whether a number of vectors in the plurality of vectors exceeds a predetermined number using the computer;

responsive to the determining, encoding the first frame and the reconstructed second frame to generate a second plurality of vectors using the computer; and using the second plurality of vectors to generate at least one intermediate frame between the second frame and the third frame.

2. The method of claim 1, wherein the video stream includes a format, a region size, and an application, the format describing a size for each frame of the video stream, the region size describing a region size covered by vectors in the plurality of vectors, and the application specifying a type for the video stream, the method further comprising setting the predetermined number using at least one of the format, the region size, and the application prior to the determining.

3. The method of claim 2, wherein the type for the video stream comprises a video conference and wherein the predetermined number comprises 80% of a total number of regions for the format.

4. The method of claim 1, wherein the using the second plurality of vectors to generate at least one intermediate frame between the second frame and the third frame comprises:

receiving a third plurality of vectors describing changes from the second frame to the third frame on the computer;

decoding the third plurality of motion vectors to produce a reconstructed third frame using the third plurality of vectors, the reconstructed third frame corresponding to the third frame;

encoding the reconstructed second frame and the reconstructed third frame to generate a fourth plurality of vectors; and using the fourth plurality of vectors, the at least one intermediate frame, and the reconstructed third frame to generate a new frame, the new frame for display in place of the reconstructed third frame.

5. A method of motion compensated interpolation on a video conferencing station for a video stream accessible to the video conferencing station as a plurality of encoded frames, the plurality of encoded frames including at least a first frame, a second frame, and a third frame, the first frame preceding the second frame in the video stream, the second frame preceding the third frame in the video stream, the method comprising:

decoding the first frame and the second frame to produce a reconstructed second frame, the reconstructed second frame corresponding to the second frame;

encoding the first frame and the reconstructed second frame using the video conferencing station to produce a plurality of vectors corresponding to the reconstructed second frame, the plurality of vectors describing changes from the first frame to the second frame;

determining a plurality of motion vectors corresponding to the reconstructed second frame from the corresponding plurality of vectors; and using the plurality of motion vectors to add at least one intermediate frame between the reconstructed second frame and the third frame, the at least one intermediate frame generated by a process of motion compensated interpolation.

6. The method of claim 5, wherein the plurality of encoded frames are accessed through receipt by the video conferencing station of a transmission of the video stream from a remote video conferencing station.

7. The method of claim 5, wherein the plurality of encoded frames comprises a plurality of Moving Pictures Expert Group level 4 (MPEG-4) format frames.

8. The method of claim 5, wherein the plurality of encoded frames comprises a plurality of H.263 format frames.

9. A method of making an intermediate frame in a video stream, the video stream including at least a first frame, a second frame, and a third frame, the first frame preceding the second frame in the video stream, the second frame preceding the third frame in the video stream, the method comprising;
    generating a plurality of motion vectors by a video conferencing station receiving the video stream;
    using the plurality of motion vectors generated by the video conferencing station receiving the video stream to make a first intermediate frame between the second frame and the third frame;
    fitting a curve according to the plurality of motion vectors generated by the video conferencing station receiving the video stream for the second frame and a second plurality of motion vectors generated by the video conferencing station receiving the video stream for the third frame; and
    using the curve to generate a second intermediate frame.

10. The method of claim 9, wherein the using further comprises:
    encoding the first frame and the second frame to generate a plurality of vectors; and determining the plurality of motion vectors from the plurality of vectors.

11. A computer data signal embodied in a carrier wave comprising:
    a computer program for improved motion compensated interpolation, the computer program comprising:
        a first set of instructions for receiving an encoded video stream comprised of a plurality of encoded frames, the plurality of encoded frames including at least a first frame, a second frame, and a third frame, the first frame preceding the second frame in the video stream, the second frame preceding the third frame in the video stream;
        a second set of instructions for decoding the first frame and the second frame to create a reconstructed second frame, the reconstructed second frame corresponding to the second frame;
        a third set of instructions for encoding the first frame and the reconstructed second frame with a motion compensated waveform encoding to produce a plurality of motion vectors corresponding to the reconstructed second frame; and
        a fourth set of instructions for using the plurality of motion vectors corresponding to the reconstructed second frame to perfonn motion compensated interpolation between the second frame and the third frame.

12. The computer program of claim 11, further comprising a fifth set of instructions for sequencing the first set of instructions, the second set of instructions, the third set of instructions, and the fourth set of instructions to operate in order on the video stream as each of the plurality of encoded frames in the video stream in received and processed by the previous set of instructions.

13. The computer program of claim 11, further comprising a fifth set of instructions for motion compensated waveform encoding and decoding.

14. The computer program of claim 11, wherein the motion compensated waveform encoding is an H.263 encoding.

15. A method of displaying a video stream using a computer coupled to a display, the video stream including at least a first frame, a second frame, and a third frame, the first frame preceding the second frame in the video stream, the second frame preceding the third frame in the video stream, the method comprising:
    receiving the first frame and a plurality of vectors describing changes from the first frame to the second frame on the computer;
    displaying the first frame on the display;
    decoding the first frame and the plurality of vectors to produce a reconstructed second frame using the computer, the reconstructed second frame corresponding to the second frame;
    displaying the reconstructed second frame on the display;
    generating at least one intermediate frame between the second frame and the third frame using the computer and the plurality of vectors;
    displaying the at least one intermediate frame;
    receiving a second plurality of vectors describing changes from the second frame to the third frame on the computer;
    using the second plurality of vectors, the at least one intermediate frame, and the reconstructed third frame to generate a new frame, the new frame for display in place of the reconstructed third frame; and
    displaying the new frame on the display.

16. The method of claim 15, wherein the generating the at least one intermediate frame further comprises:
    determining a plurality of motion vectors from the plurality of vectors; and
    creating the at least one intermediate frame from the reconstructed second frame and the plurality of motion vectors.

17. An apparatus for reconstructing a video stream, the video stream including at least a first frame, a second frame, and a third frame, the first frame preceding the second frame in the video stream, the second frame preceding the third frame in the video stream, the apparatus comprising:
    a memory means for storing the video stream; and
    a processing means for
        accessing the first frame and a plurality of vectors describing changes from the first frame to the second frame;
        decoding the first frame and the plurality of vectors to store a reconstructed second frame in the memory means, the reconstructed second frame corresponding to the second frame;
        determining whether a number of vectors in the plurality of vectors exceeds a predetermined number;
        responsive to the determining, encoding the first frame and the reconstructed second frame to generate a second plurality of vectors; and
        using the second plurality of vectors to store at least one intermediate frame between the second frame and the third frame in the memory means.

* * * * *